(12) United States Patent
Qiu

(10) Patent No.: US 9,716,670 B2
(45) Date of Patent: Jul. 25, 2017

(54) SWITCH, SWITCHING SYSTEM, SWITCHING NETWORK CHIP COMPONENT, AND FORWARDING CHIP COMPONENT

(71) Applicant: TENCENT TECHNOLOGY (Shenzhen) COMPANY LIMITED, Shenzhen, Guangdong (CN)

(72) Inventor: Zijun Qiu, Shenzhen (CN)

(73) Assignee: TENCENT TECHNOLOGY (Shenzhen) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/842,161

(22) Filed: Sep. 1, 2015

(65) Prior Publication Data

US 2016/0065500 A1 Mar. 3, 2016

(30) Foreign Application Priority Data

Sep. 2, 2014 (CN) .......................... 2014 1 0443050

(51) Int. Cl.
*H04J 14/00* (2006.01)
*H04L 12/933* (2013.01)
*H04Q 11/00* (2006.01)
*H04L 12/931* (2013.01)

(52) U.S. Cl.
CPC .......... *H04L 49/109* (2013.01); *H04L 49/405* (2013.01); *H04Q 11/0005* (2013.01); *H04Q 11/0071* (2013.01); *H04Q 2011/0039* (2013.01)

(58) Field of Classification Search
CPC .... H04J 14/02; H04J 14/0212; H04J 14/0204; H04J 14/0217; H04Q 11/0003; H04Q 11/0005; H04Q 11/0066; H04Q 11/0062; H04L 49/109; H04L 49/405; H04B 10/40
USPC ........ 398/45, 46, 47, 48, 49, 50, 51, 53, 54, 398/56, 57, 58, 135, 79, 83, 82; 385/24, 385/37, 16, 17, 18; 370/216, 217, 222, 370/225, 228, 238, 252, 235, 218
See application file for complete search history.

(56) References Cited

U.S. PATENT DOCUMENTS

| | | | |
|---|---|---|---|
| 6,185,021 B1 * | 2/2001 | Fatehi | H04Q 11/00 370/387 |
| 7,466,924 B2 * | 12/2008 | English | H04B 10/801 385/14 |
| 2004/0184401 A1 * | 9/2004 | Nguyen | H05K 7/1464 370/216 |

(Continued)

*Primary Examiner* — Hanh Phan
(74) *Attorney, Agent, or Firm* — Knobbe Martens Olson & Bear LLP

(57) ABSTRACT

Disclosed are a switch, a switching system, a switching network chip component, and a forwarding chip component. The switch includes: a switching network chip component packaged as an independent device, a forwarding chip component packaged as an independent device, and a controller. The switching system includes at least one switch and at least two network devices connected to the switch. The switching network chip component includes: a first cartridge housing, a switching network chip, a first heat dissipation component, and a first power supply component arranged inside the first cartridge housing. The forwarding chip component includes: a second cartridge housing, a forwarding chip, a second heat dissipation component, and a second power supply component arranged inside the second cartridge housing.

14 Claims, 6 Drawing Sheets

(56) References Cited

U.S. PATENT DOCUMENTS

| | | | | |
|---|---|---|---|---|
| 2008/0285449 A1* | 11/2008 | Larsson | .............. | H04L 49/1515 370/232 |
| 2011/0262135 A1* | 10/2011 | Boduch | .............. | H04L 49/1523 398/45 |
| 2015/0309265 A1* | 10/2015 | Mehrvar | .............. | G02B 6/3546 398/51 |

* cited by examiner

SWITCH, SWITCHING SYSTEM, SWITCHING NETWORK CHIP COMPONENT, AND FORWARDING CHIP COMPONENT

TECHNICAL FIELD

The present disclosure relates to the field of communications technologies, and in particular, to a switch, a switching system, a switching network chip component, and a forwarding chip component.

BACKGROUND

A switch is a network device for forwarding network data packets. The switch may provide an exclusive forwarding channel between any two network nodes accessing the switch. A core switch generally employs a frame architecture.

A frame switch is an integrated expandable switching system. Referring to FIG. 1, a schematic structural view of a frame switch 100 is given. The frame switch 100 includes a frame 110, a backplane 120, a network board 130, a switching network chip 132, a line card 140, a forwarding chip 142, and a controller 150.

One side wall of the frame 110 is provided with the backplane 120, wherein the backplane 120 is provided with a plurality of parallel slots. M network boards 130 are inserted into the slots on the backplane 120, wherein each network board 130 is provided with a switching network chip 132. N line cards 140 are inserted into the slots on the backplane 120, wherein each line card 140 is provided with a forwarding chip 142. The port of each switching network chip 132 is separately electrically connected to the ports of the N forwarding chips 142 via buses, and the port of each forwarding chip 142 is separately electrically connected to the ports of the M switching network chips 132 via buses. In addition, each forwarding chip 142 is further connected to the network port for connecting to a network node on the line card 140. The controller 150 is configured to control working of the switching network chip 132 and the forwarding chip 142. When network node A and network node B (not illustrated in the drawing) needs to communicate with each other, under control by the controller 150, a data packet is forwarded along a path of: network node A→forwarding chip A connected to network node A→switching network chip→forwarding chip B connected to network node B→network node B.

During the process of the present disclosure, the inventor finds that the prior art has the following problem:

Using a case where one switching network chip is maximally connected to X forwarding chips, and one forwarding chip is maximally connected to Y switching network chips as an example, the maximum connection mode is that each two of Y switching network chips and X forwarding chips are connected, and each switching network chip and each forwarding chip are connected to each other via a bus. Being subject to the number of slots on the frame switch and the structure and volume thereof, the frame switch fails to achieve a maximum connection scale.

SUMMARY

To solve the problem that, being subject to the number of slots on a frame switch and structure and volume thereof, practically the frame switch fails to achieve a maximum connection scale, embodiments of the present disclosure provides a switch, a switching system, a switching network chip component, and a forwarding chip component. The technical solutions are as follows:

In a first aspect, a switch is provided. The switch includes: M switching network chip components packaged as independent devices, N forwarding chip components packaged as independent devices, and a controller, M and N being natural numbers; where:

each of the switching network chip components is connected to at least one of the forwarding chip components via a network cable;

each of the forwarding chip components is connected to at least one of the switching network chip components via the network cable; and the controller is separately connected to the switching network chip components and the forwarding chip components via a management network.

In a second aspect, a switching system is provided. The switching system includes at least one switch and at least two network devices connected to the switch; where the switch is one as described in the first aspect.

In a third aspect, a switching network chip component is provided. The switching network chip component is used in the switch as described in the above first aspect and includes:

a first cartridge housing, and a switching network chip, a first heat dissipation component, and a first power supply component that are arranged inside the first cartridge housing; where:

the switching network chip component is connected to the forwarding chip component via a network cable;

the first heat dissipation component is configured to dissipate heat for the switching network chip; and the first power supply component is configured to supply power to the switching network chip.

In a fourth aspect, a forwarding chip component is provided. The forwarding chip component is used in the switch as described in the above first aspect and includes:

a second cartridge housing, and a forwarding chip, a second heat dissipation component, and a second power supply component which are arranged inside the second cartridge housing; where:

the forwarding chip component is connected to the switching network chip component via a network cable;

the second heat dissipation component is configured to dissipate heat for the forwarding chip; and the second power supply component is configured to supply power to the forwarding chip.

The technical solutions provided in the embodiments of the present disclosure achieve the following beneficial effects:

By packaging the switching network chip components as independent devices, packaging the forwarding chip component as independent devices, and forming a distributed switch through connection of those independent devices via a network cable, the problem that, due to limitations in terms of the number of slots on a frame switch, structure and volume thereof, practically the frame switch fails to achieve a maximum connection scale is solved, and the following effects are achieved: a large number of switching network chip components and forwarding chip components are accommodated without being subject to limitation of the frame size, and even a maximum connection scale is achieved. In addition, since design and manufacture costs of the frame are high, the manufacture cost is reduced due to removal of the design of the frame and backplane.

BRIEF DESCRIPTION OF THE DRAWINGS

To describe the technical solutions in the embodiments of the present disclosure more clearly, the accompanying drawings for illustrating the embodiments are briefly described below. Apparently, the accompanying drawings in the following description illustrate only some embodiments of the present disclosure, and persons of ordinary skill in the art may derive other accompanying drawings based on these accompanying drawings without any creative efforts.

DETAILED DESCRIPTION

To make the objectives, technical solutions, and advantages of the present disclosure clearer, embodiments of the present disclosure are described in detail below with reference to the accompanying drawings.

The frame switch fails to achieve a maximum connection scale mainly due to the following causes:

Due to factors such as heat dissipation, power supply, PCB board area, and frame size etc., the frame is a major cause to limitation of the connection scale of the switch. For example, under one circumstance, the frame allows accommodation of only Y/2 switching network chips and X/2 forwarding chips in the switch, wherein each switching network chip and each forwarding chip are connected via two buses. Under another circumstance, the frame allows accommodation of only Y/4 switching network chips and X/4 forwarding chips in the switch, wherein each switching network chip and each forwarding chip are connected via four buses.

In addition, if the connection scale of the switch is doubled, the frame switch needs to employ more complicated air duct design and fans with higher power to ensure good heat dissipation, and the power supply system also needs to be expanded to support the doubled connection scale. As a direct consequence, the cost is by far than being doubled. Therefore, the larger the frame is, the higher the average cost of each port in the switch is, thereby restricting user's use of a large-scale core switch.

In view of the above, reference may be made to the following embodiments.

Figure 1:
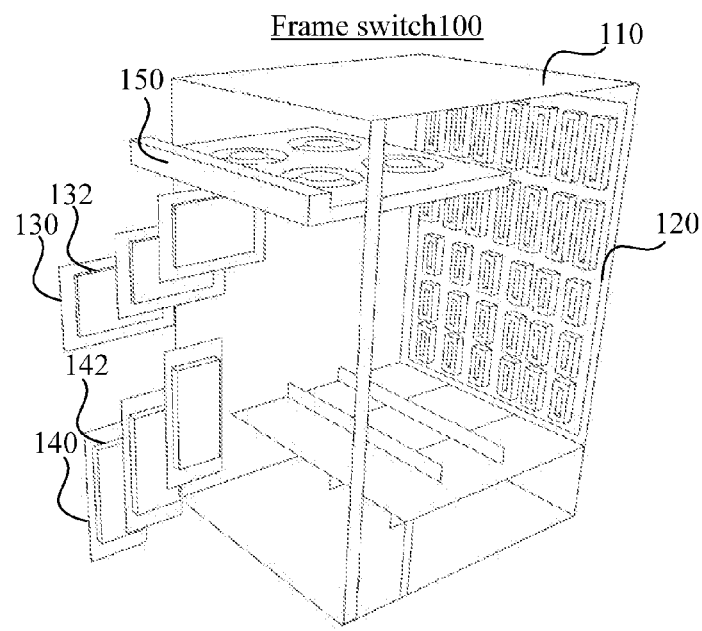
FIG. 1 is a schematic structural view of a frame switch according to the background.
Figure 2:
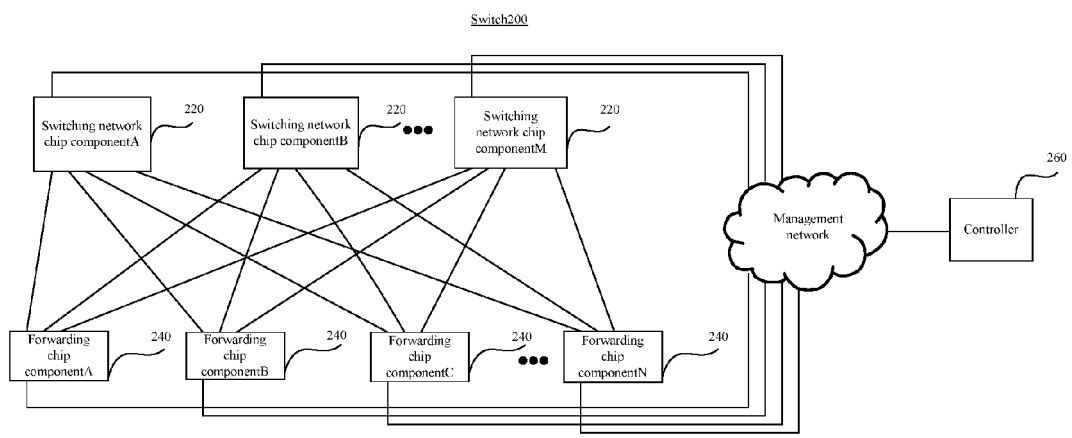
FIG. 2 is a schematic structural view of a switch according to one embodiment of the present disclosure.

FIG. 2 is a schematic structural view of a switch 200 according to one embodiment of the present disclosure. The switch 200 employs a distributed architecture. The switch 200 includes: M switching network chip components 220 packaged as independent devices, N forwarding chip components 240 packaged as independent devices, and a controller 260, M and N being natural numbers.

Each of the switching network chip components 220 is connected to at least one of the forwarding chip components 240 via a network cable.

Each of the forwarding chip components 240 is connected to at least one of the switching network chip components 220 via the network cable.

The controller 260 is separately connected to the switching network chip component 220 and the forwarding chip component 240 via a management network.

In conclusion, by means of packaging the switching network chip components as independent devices, packaging the forwarding chip component as independent devices, and forming a distributed switch through connection of those independent devices via a network cable, the switch according to this embodiment solves the problem that a frame switch fails to achieve a maximum connection scale due to limitations in terms of the number of slots on the frame switch, structure and volume thereof, and the following effects are achieved: a large number of switching network chip components and forwarding chip components are accommodated without being subject to limitation of the frame size, and even a maximum connection scale is achieved. In addition, since design and manufacture costs of the frame are high, the manufacture cost is reduced due to removal of the design of the frame and backplane.

Figure 3A:
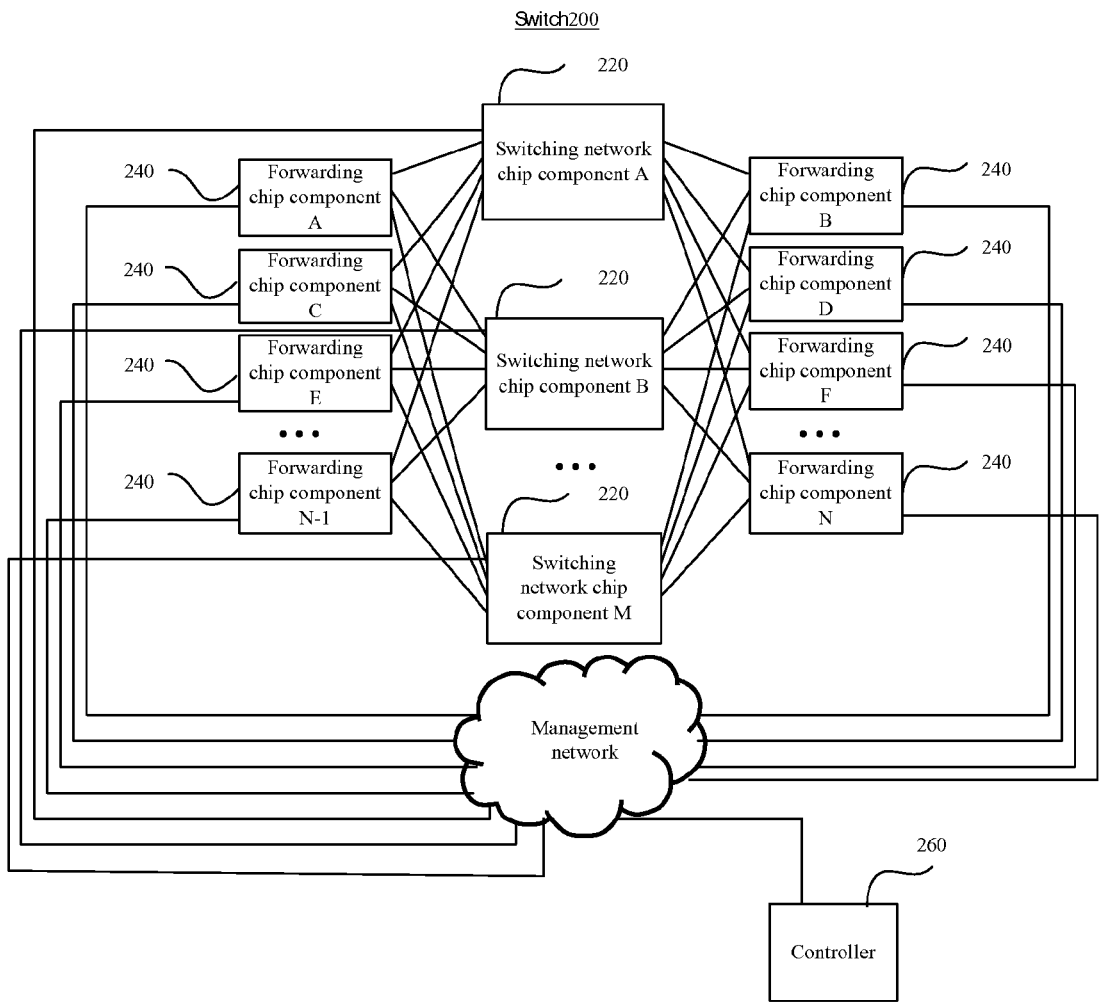
FIG. 3A is a schematic structural view of a switch according to another embodiment of the present disclosure.

FIG. 3A is a schematic structural view of a switch 200 according to another embodiment of the present disclosure. The switch 200 includes: M switching network chip components 220 packaged as independent devices, N forwarding chip components 240, and a controller 260, M and N being natural numbers.

Each of the switching network chip components 220 is provided with a switching network chip (not illustrated in the drawing), and each of the switching network chip components 220 is packaged as an independent device. For example, each of the switching network chip components 220 is packaged as an independent cartridge device.

Each of the switching network chip components 220 is connected to at least one of the forwarding chip components 240 via a network cable. That is, in a maximum connection scale, each switching network chip component 220 is separately connected to the N forwarding chip components 240 via the network cable.

Each of the forwarding chip components 240 is provided with a forwarding chip (not illustrated in the drawing), and each of the forwarding chip components 240 is packaged as an independent device. For example, each of the forwarding chip components 240 is packaged as an independent cartridge device.

Each of the forwarding chip components 240 is connected to at least one of the switching network chip components 220 via the network cable. That is, in the maximum connection scale, each forwarding chip component 240 is separately connected to the M switching network chip components 220 via the network cable.

Figure 3B:
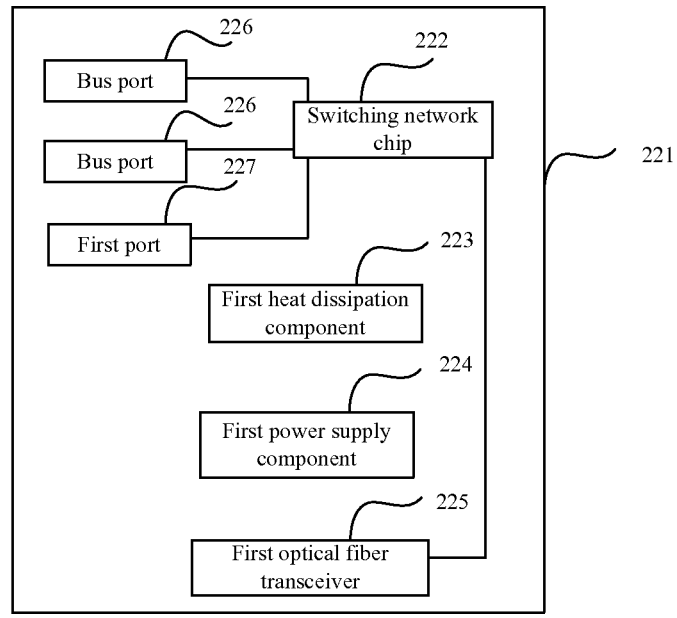
FIG. 3B is a schematic structural view of a switching network chip component in the switch according to another embodiment of the present disclosure.

Referring to FIG. 3B, in this embodiment, the switching network chip component 220 may include: a first cartridge housing 221, and a switching network chip 222, a first heat dissipation component 223, and a first power supply component 224 that are arranged inside the first cartridge housing 221, wherein the first heat dissipation component 223 is configured to dissipate heat for the switching network chip 222, and the first power supply component 224 is configured to supply power to the switching network chip 222.

Figure 3C:
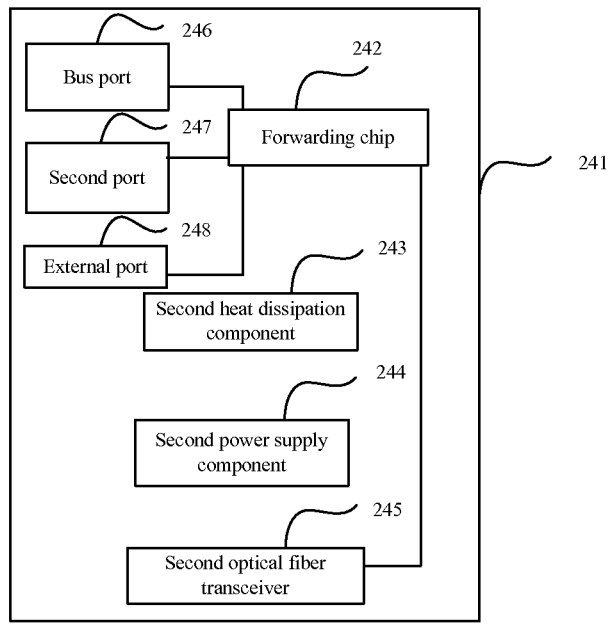
FIG. 3C is a schematic structural view of a forwarding chip component in the switch according to another embodiment of the present disclosure.

Referring to FIG. 3C, in this embodiment, the forwarding chip component 240 may include: a second cartridge housing 241, and a forwarding chip 242, a second heat dissipation component 243, and a second power supply component 244 that are arranged inside the second cartridge housing 241, wherein the second heat dissipation component 243 is configured to dissipate heat for the forwarding chip 242, and the first power supply component 244 is configured to supply power to the forwarding chip 242.

In this embodiment, the network cable is an optical fiber. In this case, the switching network chip component 220 further includes: a first optical fiber transceiver 225, wherein the first optical fiber transceiver 225 is connected to the switching network chip 222 and is configured to convert an electrical signal to be sent to the forwarding chip component 240 into an optical signal, and/or convert an optical signal sent from the forwarding chip component 240 into an electrical signal. Similarly, the forwarding chip component 240 further includes: a second optical fiber transceiver 245, wherein the second optical fiber transceiver 245 is connected to the forwarding chip 242 and is configured to convert an electrical signal to be sent to the switching network chip component 220 into an optical signal, and/or convert an optical signal sent from the switching network chip component 220 into an electrical signal.

The controller 260 is configured to manage and control the switching network chip component 220 and the forwarding chip component 240 via the management network. That is, the controller 260 is separately connected to each of the switching network chip components 220 via the management network; and is further separately connected to each of the forwarding chip components 240 via the management network.

In addition, each of the switching network chip components 220 includes at least one first port 227 configured to be connected to the controller 260; and each of the forwarding chip components 240 includes at least one second port 247 configured to be connected to the controller 260.

Optionally, the switching network chip component 220 includes X bus ports 226 configured to be connected to the forwarding chip component 240, X being greater than or equal to N, wherein the bus port 226 is generally a high-speed serial bus Serdes port; and the forwarding chip component 240 includes Y bus ports 246 configured to be connected to the switching network chip component 220, Y being greater than or equal to M, wherein the bus port 246 is generally a high-speed serial bus Serdes port. The forwarding chip component 240 further includes Z external ports 248 configured to be connected to a network device, wherein the external port 248 is generally an RJ45 port, X, Y, and Z being natural numbers.

When X is equal to N and Y is equal to M, a maximum connection scale of the switch is achieved. That is, each of the M switching network chip components is separately connected to the N forwarding chip components, and each of the N forwarding chip components is separately connected to the M switching network chip components.

As an implementation manner, a case where a switching network chip FE3200 from Broadcom is used as the switching network chip, and a forwarding chip Jericho from Broadcom is used as the forwarding chip, is used as an example for description. FE3200 is used as the switching network chip in the switching network chip component, wherein the switching network chip provides 144 buses, and totally 144 forwarding chip components may be connected. Jericho is used as the forwarding chip in the forwarding chip component, wherein the forwarding chip provides 36 buses, and totally 36 switching network chip components may be connected. When the switching network chip component includes 144 bus ports configured to be connected to the forwarding chip component, and the forwarding chip component includes 36 bus ports configured to be connected to the switching network chip component, a maximum connection scale may be achieved. That is, 36 switching network chip components are connected to 144 forwarding chip components.

In conclusion, by means of packaging the switching network chip components as independent devices, packaging the forwarding chip component as independent devices, and forming a distributed switch through connection of those independent devices via a network cable, the switch according to this embodiment, solves the problem that a frame switch fails to accommodate a large number of switching network chips and forwarding chips due to limitations in terms of the number of slots on the frame switch, structure and volume thereof, and the following effects are achieved: a large number of switching network chip components and forwarding chip components are accommodated without being subject to limitation of the frame size, and even a maximum connection scale is achieved. In addition, since design and manufacture costs of the frame are high, the manufacture cost is reduced due to removal of the design of the frame and backplane.

With the switch according to this embodiment, by using an optical fiber as the network cable to connect the switching network chip component and the forwarding chip component, the problem that a traditional network cable causes a low transmission rate and only implements short-range transmission is solved, thereby increasing the transmission rate and enhancing the transmission range.

Figure 4:
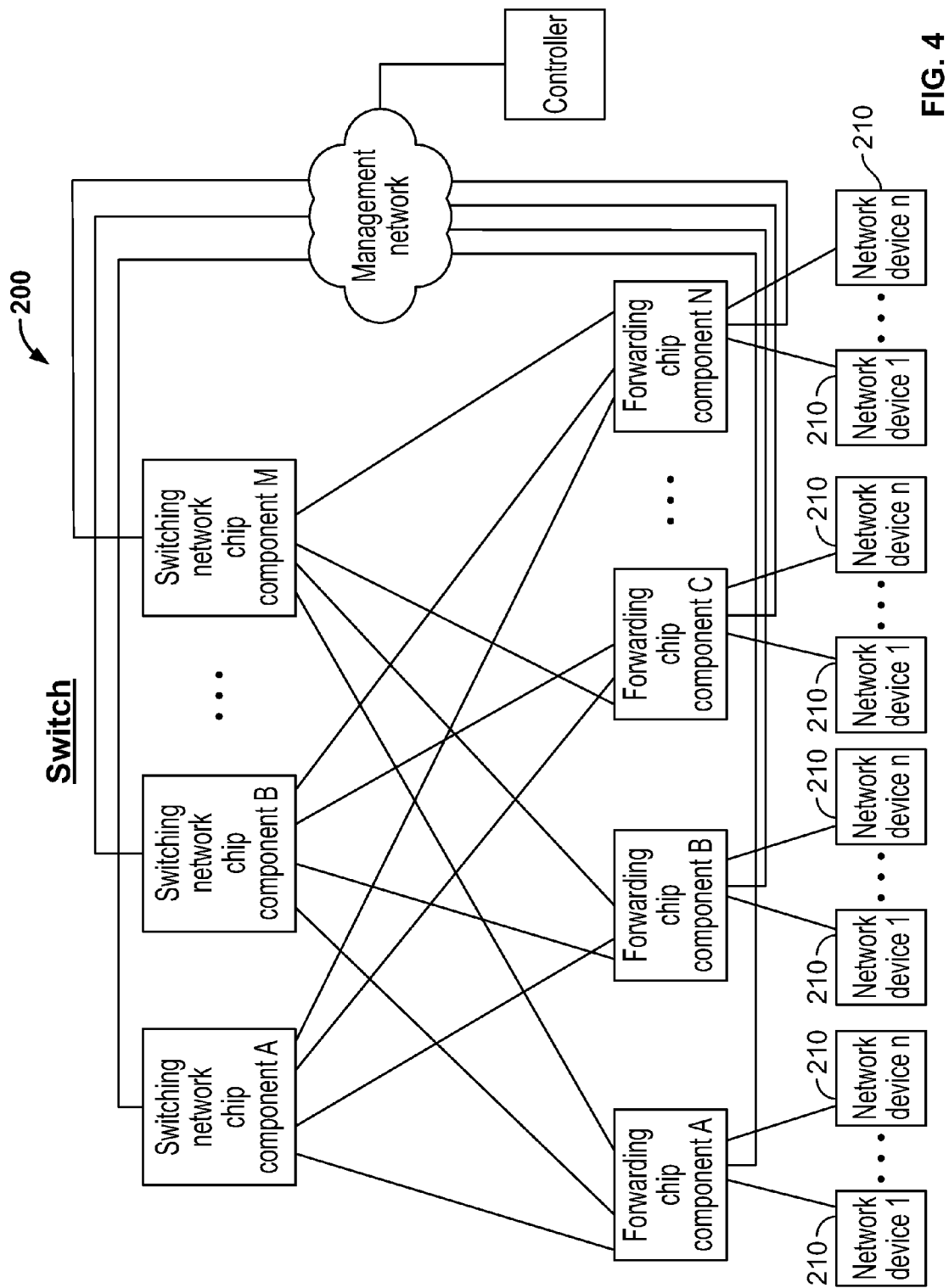
FIG. 4 is a schematic structural view of a switching system according to another embodiment of the present disclosure.

FIG. 4 is a schematic structural view of a switching system according to another embodiment of the present disclosure. The switching system includes at least one switch 200 and at least two network devices 210 connected to the switch 200.

For details about the switch 200, reference may be made to the switch illustrated in FIG. 2 or FIG. 3.

The switch 200 is connected to at least two external devices 210 via a network cable, which specifically refers to that the forwarding chip component in the switch is connected to at least two network devices. That is, Z external ports 248 (not illustrated in the drawing) in the forwarding chip component 240 is connected to at least two network devices 210, wherein the external port 248 is generally an RJ45 port, and Z is a natural number. For example, each forwarding chip component is connected to N network devices 210. That is, the Z external ports 248 (not illustrated in the drawing) in the forwarding chip component 240 are connected to the N network devices 210. The network cable may be an Ethernet cable for RJ45 port or an optical fiber.

The network device 210 may be a smartphone, a tablet computer, an e-book reader, a Moving Picture Experts Group Audio Layer III (MP3) player, a Moving Picture Group Audio Layer IV (MP4) player, a laptop computer, a desktop computer, a server, and the like.

In conclusion, with the switching system according to this embodiment, by connecting the switch to the network device, the problem of transmitting data between a plurality of external devices is solved, and an effect of transmitting data via the switch is achieved.

In conclusion, by means of packaging the switching network chip components as independent devices, packaging the forwarding chip component as independent devices, and forming a distributed switch through connection of those independent devices via a network cable, the switch according to this embodiment, solves the problem that a frame switch fails to accommodate a large number of switching network chips and forwarding chips due to limitations in terms of the number of slots on the frame switch, structure and volume thereof, and the following effects are achieved: a large number of switching network chip components and forwarding chip components are accommodated without being subject to limitation of the frame size, and even a maximum connection scale is achieved. In addition, since design and manufacture costs of the frame are high, the manufacture cost is reduced due to removal of the design of the frame and backplane.

With the switch according to this embodiment, by using an optical fiber as the network cable to connect the switching network chip component and the forwarding chip component, the problem that a traditional network cable causes a low transmission rate and only supports short-range transmission is solved, thereby increasing the transmission rate and enhancing the transmission range.

Figure 5:
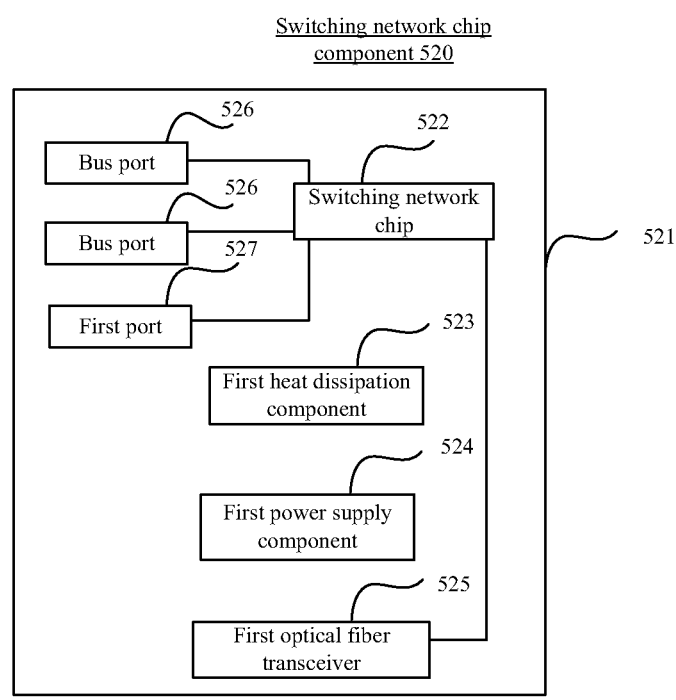
FIG. 5 is a schematic structural view of a switching network chip component according to another embodiment of the present disclosure.

FIG. 5 is a schematic structural view of a switching network chip component 520 according to another embodiment of the present disclosure. The switching network chip component 520 includes:

a first cartridge housing 521, and a switching network chip 522, a first heat dissipation component 523, and a first power supply component 524 that are arranged inside the first cartridge housing 521.

The switching network chip 522 is configured to be connected to the forwarding chip component 540 via a network cable. When there are N forwarding chip components 540, the switching network chip 522 is separately connected to the N forwarding chip components 540 via the network cable.

In this embodiment, the network cable is an optical fiber. In this case, the switching network chip component 520 further includes: a first optical fiber transceiver 525, wherein the first optical fiber transceiver 525 is connected to the switching network chip 522 and is configured to convert an electrical signal to be sent to the forwarding chip component 540 into an optical signal, and/or convert an optical signal sent from the forwarding chip component 540 into an electrical signal.

In this embodiment, each switching network chip component 520 further includes X bus ports 526 configured to be connected to the N forwarding chip components 540, X being greater than or equal to N; and each switching network chip component 520 includes at least one first port 527 configured to be connected to the controller 560.

The bus port 526 in the switching network chip component 520 is generally a high-speed series bus Serdes port.

The first heat dissipation component 523 is configured to dissipate heat for the switching network chip 522.

The first heat dissipation component may be a metal heat dissipation sheet, a fan, or a liquid-cooled or another type of heat dissipation device.

The first power supply component 524 is configured to supply power to the switching network chip 522.

In conclusion, with the switching network chip component according to this embodiment, by using the first cartridge housing and arranging the switching network chip, the first heat dissipation component, and the first power supply component inside the first cartridge housing, the problem that too many resources are consumed for centralized heat dissipation and power supply for the switching network chip, and that the implementation is very complicated, is solved, thereby achieving an effect of simplifying heat dissipation and reducing power consumption.

Figure 6:
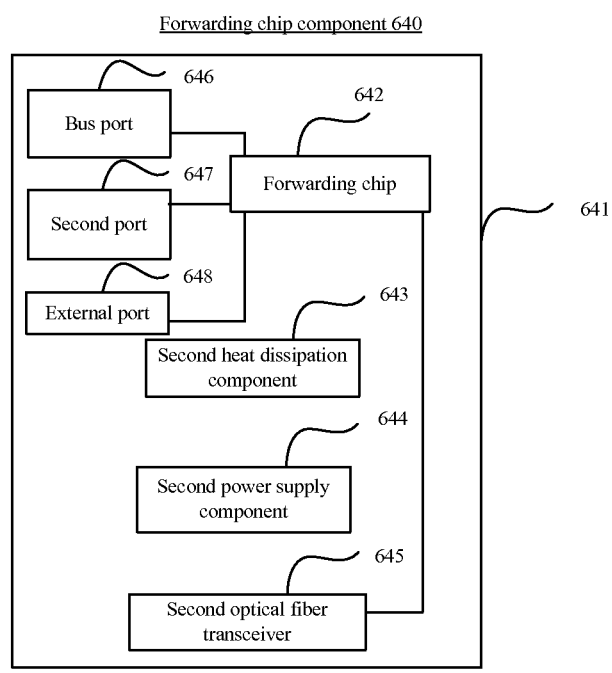
FIG. 6 is a schematic structural view of a forwarding chip component according to another embodiment of the present disclosure.

FIG. 6 is a schematic structural view of a forwarding chip component 640 according to another embodiment of the present disclosure. The forwarding chip component 640 includes:

a second cartridge housing 641, and a forwarding chip 642, a second heat dissipation component 643, and a second power supply component 644 that are arranged inside the second cartridge housing 641.

The forwarding chip 642 is configured to be connected to the switching network chip component 620 via a network cable. When there are M switching network chip components 620, the forwarding chip 642 is separately connected to the M switching network chip components 620 via the network cable.

In this embodiment, the network cable is an optical fiber. Similarly, the forwarding chip component 640 further includes: a second optical fiber transceiver 645, wherein the second optical fiber transceiver 645 is connected to the forwarding chip 642 and is configured to convert an electrical signal to be sent to the switching network chip component 620 into an optical signal, and/or convert an optical signal sent from the switching network chip component 620 into an electrical signal.

In this embodiment, each forwarding chip component 640 includes Y bus ports 646 configured to be connected to the switching network chip component 620, Y being greater than or equal to M, wherein the bus port 646 is generally a high-speed serial bus Serdes port. The forwarding chip component 640 further includes Z external ports 648 configured to be connected to a network device, wherein the external port 648 is generally an RJ45 port, X, Y, and Z being natural numbers. Each forwarding chip component 640 includes at least one second port 647 configured to be connected to a controller 660.

The second heat dissipation component 643 is configured to dissipate heat for the forwarding chip 642.

The first heat dissipation component may be a metal heat dissipation sheet, a fan, or a liquid-cooled or another type of heat dissipation device.

The second power supply component 644 is configured to supply power to the forwarding chip 642.

In conclusion, with the forwarding chip component according to this embodiment, by using the second cartridge housing and arranging the forwarding chip, the second heat dissipation component, and the second power supply component inside the second cartridge housing, the problem that too many resources are consumed for centralized heat dissipation and power supply for the forwarding chip, and that the implementation is very complicated, is solved, thereby achieving an effect of simplifying heat dissipation and reducing power consumption.

The sequence numbers of the preceding embodiments of the present disclosure are only for ease of description, but do not denote the preference of the embodiments.

Persons of ordinary skill in the art should understand that all or part of steps of the preceding methods may be implemented by hardware or hardware following instructions of programs. The programs may be stored in a non-transitory computer-readable storage medium, and may be executed by at least one processor. The storage medium may be a read only memory, a magnetic disk, or a compact disc-read only memory.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A switch, comprising: M switching network chip components packaged as independent devices, N forwarding chip components packaged as independent devices, and a controller, M and N being natural numbers;
   each of the switching network chip components being connected to at least one of the forwarding chip components directly via a network cable;
   each of the forwarding chip components being connected to at least one of the switching network chip components directly via the network cable; and
   the controller being separately connected to the switching network chip components and the forwarding chip components via a management network;
   wherein the switching network chip component comprises: a first cartridge housing, a switching network chip, and a first heat dissipation component, that are arranged inside the first cartridge housing, the first heat dissipation component being configured to dissipate heat for the switching network chip; and
   wherein the forwarding chip component comprises: a second cartridge housing, a forwarding chip, and a second heat dissipation component, that are arranged inside the second cartridge housing, the second heat dissipation component being configured to dissipate heat for the forwarding chip.

2. The switch according to claim 1, wherein:
   each of the switching network chip components is separately connected to the N forwarding chip components directly via the network cable; and
   each of the forwarding chip components is separately connected to the M switching network chip components directly via the network cable.

3. The switch according to claim 2, wherein:
   the switching network chip component comprises X bus ports configured to be connected to the forwarding chip component, X being greater than or equal to N; and
   the forwarding chip component comprises Y bus ports configured to be connected to the switching network chip component, Y being greater than or equal to M; and the forwarding chip component further comprises Z external ports configured to be connected to a network device, X, Y, and Z being natural numbers.

4. The switch according to claim 1, wherein the network cable is an optical fiber;
   the switching network chip component further comprises: a first optical fiber transceiver, the first optical fiber transceiver being configured to convert an electrical signal to be sent to the forwarding chip component into an optical signal, and/or convert an optical signal sent from the forwarding chip component into an electrical signal; and
   the forwarding chip component further comprises: a second optical fiber transceiver, the second optical fiber transceiver being configured to convert an electrical signal to be sent to the switching network chip component into an optical signal, and/or convert an optical signal sent from the switching network chip component into an electrical signal.

5. The switch according to claim 1, wherein the switching network chip component further comprises:
   a first power supply component arranged inside the first cartridge housing,
   the first power supply component being configured to supply power to the switching network chip.

6. The switch according to claim 5, wherein:
   each of the switching network chip components is separately connected to the N forwarding chip components directly via the network cable; and
   each of the forwarding chip components is separately connected to the M switching network chip components directly via the network cable.

7. The switch according to claim 5, wherein the network cable is an optical fiber;
   the switching network chip component further comprises:
   a first optical fiber transceiver, the first optical fiber transceiver being configured to convert an electrical signal to be sent to the forwarding chip component into an optical signal, and/or convert an optical signal sent from the forwarding chip component into an electrical signal; and
   the forwarding chip component further comprises: a second optical fiber transceiver, the second optical fiber transceiver being configured to convert an electrical signal to be sent to the switching network chip component into an optical signal, and/or convert an optical signal sent from the switching network chip component into an electrical signal.

8. The switch according to claim 1, wherein the forwarding chip component further comprises:
   a second power supply component arranged inside the second cartridge housing,
   the second power supply component being configured to supply power to the forwarding chip.

9. The switch according to claim 8, wherein:
   each of the switching network chip components is separately connected to the N forwarding chip components directly via the network cable; and
   each of the forwarding chip components is separately connected to the M switching network chip components directly via the network cable.

10. The switch according to claim 8, wherein the network cable is an optical fiber;
    the switching network chip component further comprises:
    a first optical fiber transceiver, the first optical fiber transceiver being configured to convert an electrical signal to be sent to the forwarding chip component into an optical signal, and/or convert an optical signal sent from the forwarding chip component into an electrical signal; and
    the forwarding chip component further comprises: a second optical fiber transceiver, the second optical fiber transceiver being configured to convert an electrical signal to be sent to the switching network chip component into an optical signal, and/or convert an optical signal sent from the switching network chip component into an electrical signal.

11. The switch according to claim 1, wherein:
    the switching network chip component comprises at least one first port configured to be connected to the controller; and
    the forwarding chip component comprises at least one second port configured to be connected to the controller.

12. A switching system, comprising at least one switch and at least two network devices connected to the switch; where
    the switch is one as claimed in claim 1.

13. A switching network chip component, wherein the switching network chip component is used in the switch according to claim 1, and the switching network chip component comprises: a first cartridge housing, and a switching network chip, a first heat dissipation component, and a first power supply component that are arranged inside the first cartridge housing;
  the switching network chip being connected to the forwarding chip component directly via a network cable;
  the first heat dissipation component being configured to dissipate heat for the switching network chip; and
  the first power supply component being configured to supply power to the switching network chip.

14. A forwarding chip component, wherein the forwarding chip component is used in the switch according to claim 1, and the forwarding chip component comprises: a second cartridge housing, and a forwarding chip, a second heat dissipation component, and a second power supply component that are arranged inside the second cartridge housing;
  the forwarding chip being connected to the switching network chip component directly via a network cable;
  the second heat dissipation component being configured to dissipate heat for the forwarding chip; and
  the second power supply component being configured to supply power to the forwarding chip.

* * * * *